Jan. 1, 1924
S. E. HORTON
CHUCK
Filed July 3, 1920
1,479,604
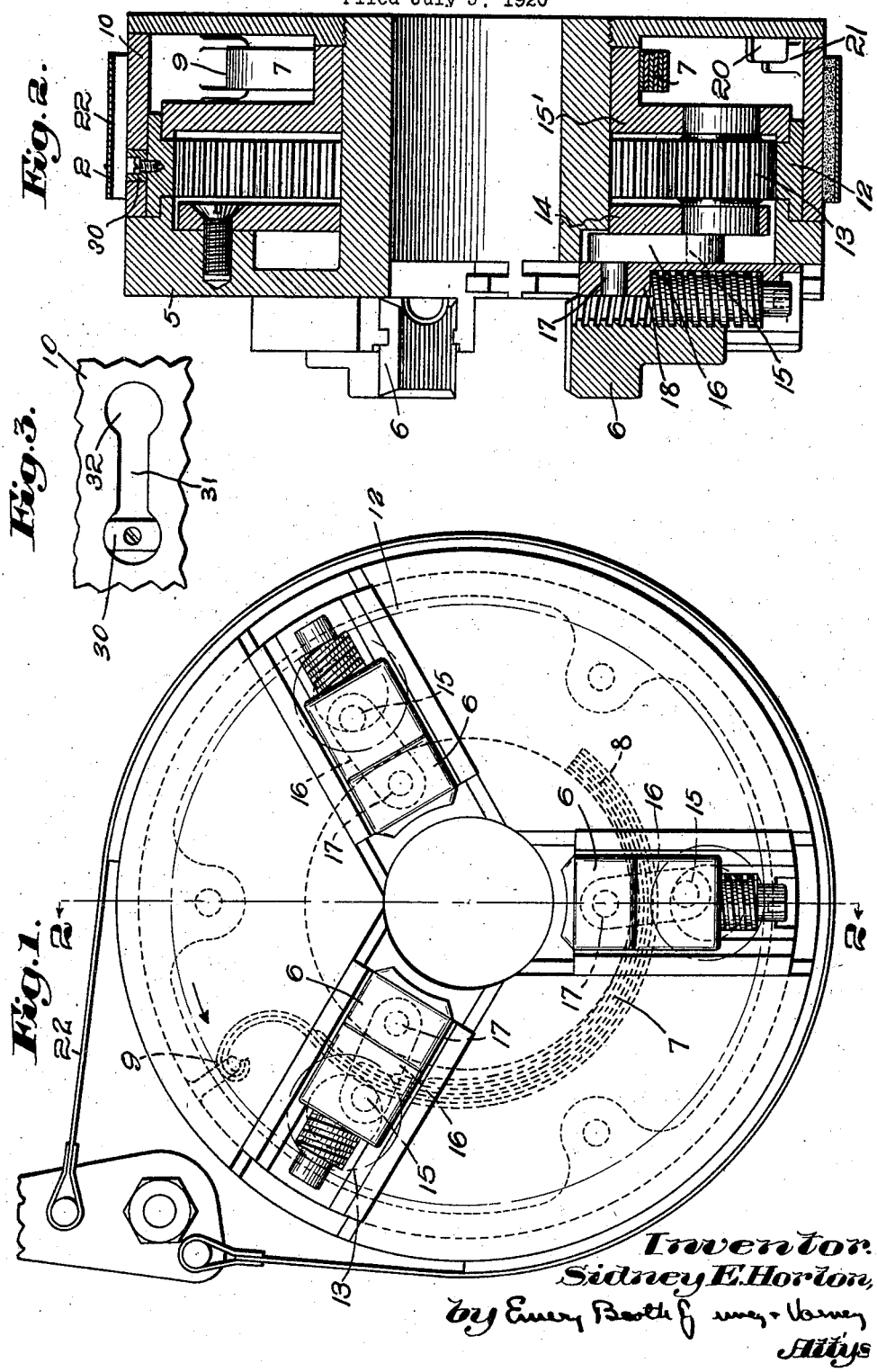
Inventor.
Sidney E. Horton,
by Emery Booth Janney + Varney
Attys Patented Jan. 1, 1924.

1,479,604

UNITED STATES PATENT OFFICE.

SIDNEY E. HORTON, OF WINDSOR LOCKS, CONNECTICUT, ASSIGNOR TO THE E. HORTON & SON COMPANY, OF WINDSOR LOCKS, CONNECTICUT, A CORPORATION OF CONNECTICUT.

CHUCK.

Application filed July 3, 1920. Serial No. 393,988.

*To all whom it may concern:*

Be it known that I, SIDNEY E. HORTON, a citizen of the United States, and a resident of Windsor Locks, in the county of Hartford, State of Connecticut, have invented a new and useful Improvement in Chucks, of which the following description, in connection with the accompanying drawings, is a specification, like characters on the drawings representing like parts.

This invention pertains to improvements in chucks.

It is among the objects of the invention to provide a chuck of simple construction, which is at the same time efficient in operation.

In the drawings, which show a preferred form of one embodiment of my invention:—

Figure 1 is a front elevation of a chuck;

Fig. 2 is a section on the line 2—2 of Fig. 1; and

Fig. 3 shows a detail of preferred mechanism used in changing the chuck from internal chucking to external chucking and vice versa.

Referring to the drawings and to the preferred form of my invention selected for illustrative purposes, I have shown a chuck including a body 5 carrying jaws 6 adapted to grip the work and adapted to be moved in work-gripping direction by resilient means typified by the spring 7. The spring 7 may be connected at one end 8 to the chuck body and at the other end 9 to a part adapted to oscillate relative to the chuck body, such oscillatory part being herein typified by the oscillatory member 10, which is preferably located at the periphery of the chuck and which preferably carries an internal gear 12, which, therefore, also oscillates and is the effective element of said oscillatory part. Meshing with the internal gear 12, I preferably provide, as shown, a plurality of pinions 13 which may be journalled in disks or spiders 14, 15′, secured to the chuck body. The spring 7 constantly tends to rotate the ring 10 and parts connected therewith relative to the chuck body, such rotation or partial rotation being in the direction of the arrow shown in Fig. 1. The internal gear 12, being secured to the ring 10, is moved therewith and imparts rotation to the pinions 13. The pinions 13 carry cranks or eccentric members 15, which impart work-gripping movement to the jaws 6 through any suitable mechanism typified by the links 16 having pivotal connections 17 with the slide jaws 18 of the chuck. The slide jaws 18, which carry the work-gripping jaws 6, are held in guided relation to the chuck body in any usual or suitable manner.

It will be clear from the foregoing description that, when the internal gear 12 moves in the direction of the arrow shown in Fig. 1, the pinions 13 meshing therewith will be turned in a contra-clockwise direction, thereby moving the eccentric pivots 15 toward the axis of the chuck and, through the links 16, moving the pivots 17 toward the axis of the chuck, thereby actuating the jaws in work-gripping direction. The parts as shown in Fig. 1 are assembled for external chucking. When it is desired to adapt the chuck to internal chucking, the internal gear 12 may be turned relative to the ring 10 sufficient distance to turn the pinions 13 through one hundred and eighty degrees of movement. After this adjustment of the internal gear 12 and ring 10, these parts are secured together in their new relationship and relative movement of the ring 10 and rack 12 actuated by the spring 7 will now tend to move the pinions in a contra-clockwise direction but through a field of movement which will draw the pivot 15 and hence the pivot 17 and jaws connected thereto in a direction away from the axis of the chuck. The amount of spring-actuated movement between the chuck body and the ring 10 and connected parts may be limited by any suitable stop mechanism typified by the lug 20 secured to the chuck body and the lug 21 secured to the ring 10.

The spring 7 may be of any suitable kind, but I prefer a spring of the leaf type, which tends either to straighten by reaction as shown, or, if desired, to become more greatly flexed by reaction.

The opening of the chuck jaws may be effected by any suitable mechanism acting against the resiliency of the spring 7, but I prefer to open the jaws by oscillatory movement of the ring 10 relative to the chuck body, such oscillatory movement being in a direction relative to the chuck body opposite to that indicated by the arrow in Fig. 1. I have indicated in the drawing, brake mechanism 22 the application of which, assuming the chuck body to be rotating with the head stock of the lathe in the direction indicated by the arrow in Fig. 1, will retard the ring 10, thereby producing a limited amount of rotation of the ring 10 relative to the chuck body in a direction opposite to that indicated by the arrow in Fig. 1. It is obvious that this relative movement will rotate the pinions 13 and retract the jaws from the work, whether the chuck be adjusted for internal chucking or for external chucking.

A preferred form of connection between the ring 10 and internal gear 12 is diagrammatically shown in Fig. 3. When the screw 30 is in the position indicated in Fig. 3, the internal gear is in proper position for external chucking. When it is desired to adjust the chuck for internal chucking, the screw 30 is turned ninety degrees so that the narrow portion of the shank will fit in the slot 31 and then the screw, with the ring gear attached, is moved the length of the slot 31 and into the aperture 32 where the screw is again turned ninety degrees. This movement of the screw 30 the length of the slot 31 is in the embodiment of the invention shown in the drawings, just sufficient to turn the pinions 13 through one hundred and eighty degrees so as to produce reversal of spring-actuated movement of the jaws.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. A chuck comprising, in combination, a body, a plurality of jaws, an oscillatory part, spring means urging said oscillatory part in one direction relative to the chuck body, brake means permitting movement of said oscillatory part in the opposite direction relative to the chuck body, and changeable connections operatively interposed between said oscillatory part and said spring, said connections permitting oscillation of said oscillatory part in spring-actuated direction to actuate said jaws toward the axis of the chuck for external chucking, or from the axis of the chuck for internal chucking.

2. A chuck comprising, in combination, a body, jaws, a plurality of pinions, one connected to each of said jaws, a gear meshing with said pinions, spring means urging rotation of said gear relative to said chuck body, and a changeable connection between said spring and gear permitting sufficient shifting of the operative relation between said spring and said gear operatively to reverse the direction of spring-actuated movement of said jaws.

3. A chuck comprising, in combination, a body, a plurality of jaws, a plurality of pinions, one connected to each of said jaws, eccentric means between said pinions and jaws, internal gear means meshing with said pinions and means providing for oscillating said internal gear through one field of oscillation to actuate work-gripping and work-releasing movement of said jaws for external chucking and for oscillating said internal gear through another field of oscillation to actuate work-gripping and work-releasing movement of said jaws for internal chucking.

4. A chuck comprising, in combination, a body, a plurality of jaws, a plurality of pinions, one connected to each of said jaws, eccentric means between said pinions and jaws, internal gear means meshing with said pinions, means providing for oscillating said internal gear through one field of oscillation to actuate work-gripping and work-releasing movement of said jaws for external chucking and for oscillating said internal gear through another field of oscillation to actuate work-gripping and work-releasing movement of said jaws for internal chucking, and spring means for actuating oscillation of said gear in work-gripping directions for both internal and external chucking.

5. A chuck comprising, in combination, a body, a plurality of jaws, a plurality of pinions, one connected to each of said jaws, eccentric means between said pinions and jaws, gear means meshing with said pinions and means providing for oscillating said gear through one field of oscillation to actuate work-gripping and work-releasing movement of said jaws for external chucking and for oscillating said gear through another field of oscillation to actuate work-gripping and work-releasing movement of said jaws for internal chucking.

In testimony whereof, I have signed my name to this specification.

SIDNEY E. HORTON.